US012612118B2

(12) United States Patent
Newcomb et al.

(10) Patent No.: US 12,612,118 B2
(45) Date of Patent: Apr. 28, 2026

(54) STRUCTURAL, FIBER REINFORCED COMPOSITE PANEL RIGIDLY ATTACHED TO AN INTERFACE SURFACE

(71) Applicant: GM GLOBAL TECHNOLOGY OPERATIONS LLC, Detroit, MI (US)

(72) Inventors: Bradley Allen Newcomb, Troy, MI (US); Giles D. Bryer, Northville, MI (US); Shrinivas Lankalapalli, Farmington Hills, MI (US); Sudeep Chavare, Northville, MI (US); Rajan R. Chakravarty, Troy, MI (US); Thomas S. Prevost, West Bloomfield, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 434 days.

(21) Appl. No.: 18/322,999

(22) Filed: May 24, 2023

(65) Prior Publication Data

US 2024/0391535 A1     Nov. 28, 2024

(51) Int. Cl.
  *B62D 25/06*     (2006.01)
  *B62D 27/02*     (2006.01)
  *B62D 29/04*     (2006.01)
(52) U.S. Cl.
  CPC ........... *B62D 29/048* (2013.01); *B62D 25/06* (2013.01); *B62D 27/026* (2013.01)
(58) Field of Classification Search
  CPC ...... B62D 25/02; B62D 25/06; B62D 29/048; B62D 29/005; B62D 29/04; B62D 29/043; B62D 27/06; B60J 1/006

USPC ..... 296/191, 84.1, 196.21, 210, 215, 146.15
See application file for complete search history.

(56)     References Cited

U.S. PATENT DOCUMENTS

| | | | | |
|---|---|---|---|---|
| 5,988,074 A | * | 11/1999 | Thoman | B61D 17/005 |
| | | | | 105/396 |
| 11,267,514 B2 | | 3/2022 | Aitharaju et al. | |
| 11,358,647 B1 | | 6/2022 | Newcomb et al. | |
| 11,383,771 B1 | | 7/2022 | Newcomb et al. | |
| 11,420,683 B2 | | 8/2022 | Newcomb et al. | |
| 11,541,939 B2 | | 1/2023 | Newcomb et al. | |
| 2022/0212449 A1 | | 7/2022 | Newcomb et al. | |
| 2023/0054062 A1 | | 2/2023 | Newcomb et al. | |
| 2023/0055378 A1 | | 2/2023 | Newcomb et al. | |

FOREIGN PATENT DOCUMENTS

| | | | | | |
|---|---|---|---|---|---|
| CN | 211172744 U | * | 8/2020 | | |
| JP | 2019517974 A | * | 6/2019 | .......... | H04M 1/0268 |
| JP | 7205311 B2 | * | 1/2023 | .............. | B60J 7/043 |

OTHER PUBLICATIONS

CN211172744 text (Year: 2020).*
JP2019517974 Text (Year: 2019).*
JP7205311 Text (Year: 2023).*

(Continued)

*Primary Examiner* — Dennis H Pedder

(57)     ABSTRACT

A structural component comprises a body structure defining an interface surface. A composite panel comprises a plurality of reinforcing fibers encapsulated in a resin. An adhesive affixes the composite panel to the interface surface of the body structure. The adhesive has a stiffness in a range from 50 MPa to 2 GPa.

20 Claims, 9 Drawing Sheets

(56)            References Cited

OTHER PUBLICATIONS

U.S. Appl. No. 17/584,557, filed Jan. 26, 2022, Newcomb et al.
U.S. Appl. No. 17/667,260, filed Feb. 8, 2022, Newcomb et al.
U.S. Appl. No. 17/699,696, filed Mar. 21, 2022, Newcomb et al.
U.S. Appl. No. 17/825,041, filed May 26, 2022, Newcomb et al.
U.S. Appl. No. 17/899,127, filed Aug. 30, 2022, Newcomb et al.
U.S. Appl. No. 17/968,401, filed Oct. 18, 2022, Newcomb et al.
U.S. Appl. No. 18/112,339, filed Feb. 21, 2023, Newcomb et al.

* cited by examiner

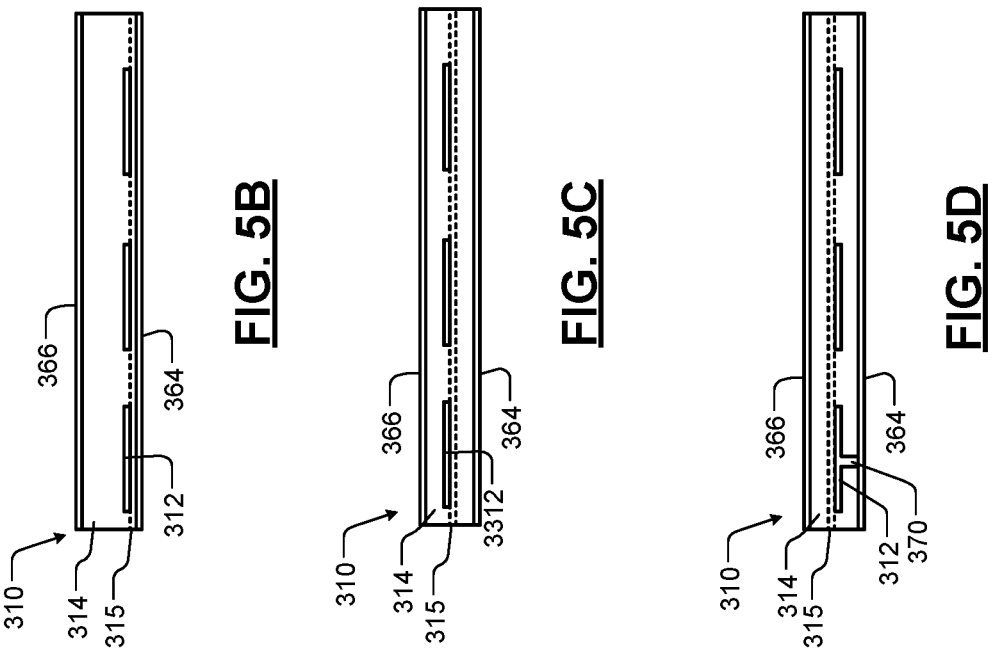
FIG. 5B
FIG. 5C
FIG. 5D
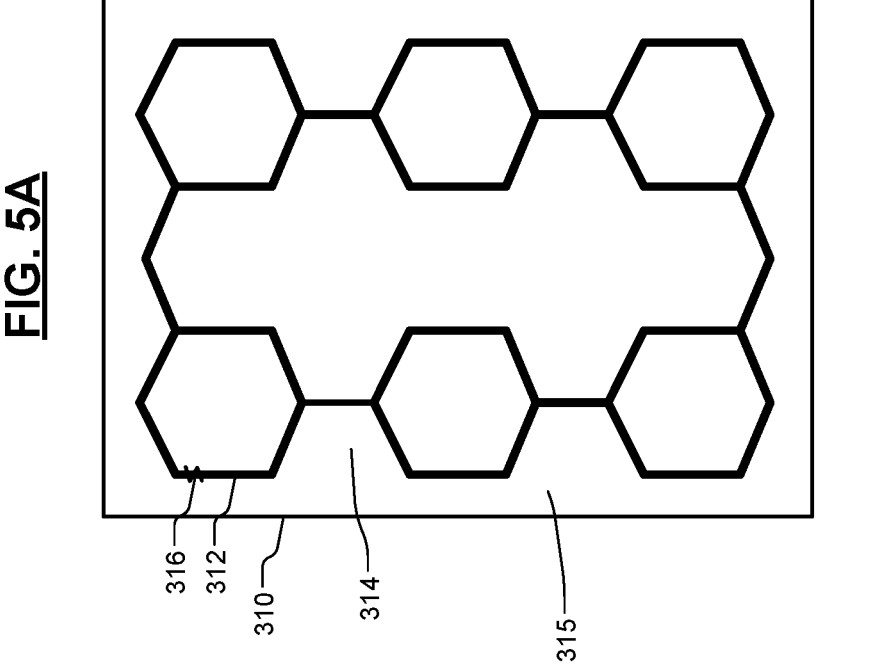
FIG. 5A

STRUCTURAL, FIBER REINFORCED COMPOSITE PANEL RIGIDLY ATTACHED TO AN INTERFACE SURFACE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composite panels, and more particularly to a composite panel rigidly attached to an interface surface.

Some vehicles include transparent panels such as transparent glass panels that are affixed to a roof structure of a vehicle. The transparent glass panels provide limited structural support. The transparent glass panels are typically attached to the vehicle using a thick layer of low stiffness adhesive to limit loads transferred to the transparent glass panels and to provide vibration isolation for the glass panel.

SUMMARY

A structural component comprises a body structure defining an interface surface. A composite panel comprises a plurality of reinforcing fibers encapsulated in a resin. An adhesive affixes the composite panel to the interface surface of the body structure. The adhesive has a stiffness in a range from 50 MPa to 2 GPa.

In other features, the body structure includes one or more materials selected from a group consisting of metal, ceramic, and composite. The body structure comprises at least one of a roof rail and a header of a vehicle and the composite panel comprises a roof panel. At least a portion of the composite panel is transparent. The plurality of reinforcing fibers is continuous, locally applied, and includes at least one fiber selected from a group consisting of carbon fibers, glass fibers, and basalt fibers.

In other features, the plurality of reinforcing fibers comprises dry fibers infused with the resin. The resin comprises thermoset resin. The dry fibers are stitched to a backing substrate. The plurality of reinforcing fibers are commingled with a non-reinforcing fiber. A coating is arranged on at least one surface of the composite panel. The coating is selected from a group consisting of a scratch resistant coating, an ultraviolet resistant coating, and an infrared resistant coating.

In other features, the resin is mixed with at least one material selected from a group consisting of short fibers, long fibers, and minerals. The resin is mixed with an additive selected from a group consisting of a scratch resistant additive, an ultraviolet resistant additive, and an infrared resistant additive.

A roof of a vehicle comprises an interface surface defined by at least one of a roof rail and a header of a roof structure of a vehicle. A composite roof panel comprises a plurality of continuous reinforcing fibers stitched to a backing substrate and encapsulated in a resin. At least one of a first adhesive affixing the composite roof panel to the interface surface, wherein the first adhesive has a stiffness in a range from 50 MPa to 2 GPa, and fasteners and a second adhesive affixing the composite roof panel to the interface surface.

In other features, the first adhesive affixes the composite roof panel to the interface surface. The fasteners and a second adhesive affix the composite roof panel to the interface surface. At least a portion of the composite roof panel is transparent. The plurality of continuous reinforcing fibers include at least one fiber material selected from a group consisting of carbon, glass, and basalt.

In other features, the plurality of continuous reinforcing fibers are commingled with non-reinforcing fibers. A coating is arranged on at least one surface of the composite roof panel. The coating is selected from a group consisting of a scratch resistant coating, an ultraviolet resistant coating, and an infrared resistant coating. The resin is mixed with at least one material selected from a group consisting of short fibers, long fibers, and minerals. The resin is mixed with an additive selected from a group consisting of a scratch resistant additive, an ultraviolet resistant additive, and an infrared resistant additive.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5A is a plan view of an example of a composite preform according to the present disclosure;

FIG. 5B to 5D are side cross-sectional views of examples of composite preforms according to the present disclosure.

In the drawings, reference numbers may be reused to identify similar and/or identical elements.

DETAILED DESCRIPTION

Figure 1A:
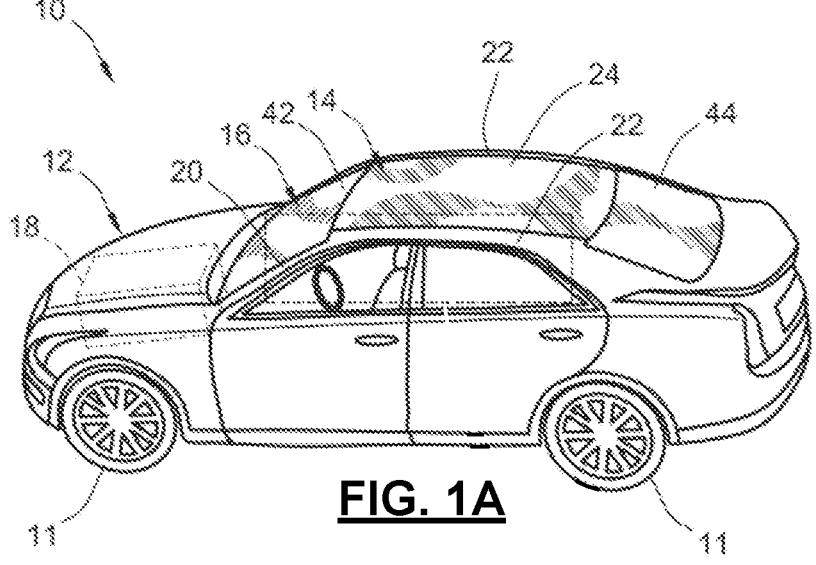
FIG. 1A is a perspective view of an example of a vehicle including a structural, fiber reinforced composite body panel bonded to a roof structure of a vehicle using high stiffness adhesive according to the present disclosure.

While the following description relates to structural, fiber reinforced composite panels that are bonded to a roof structure of a vehicle using high stiffness adhesive, the structural, fiber reinforced composite panels described herein can be used in other vehicle applications, aerospace applications, stationary applications (e.g., architecture), non-vehicular applications, etc.

Transparent panels such as glass panels are often used on roofs of vehicles. The glass panels are heavy and do not provide meaningful structural benefits. The glass panels are attached to a roof structure of a vehicle using a soft adhesive (e.g., lower stiffness) having a stiffness that is less than 20 MPa (e.g., about 10 MPa). The soft adhesive is used to allow the glass panel to "float" or move, which prevents chipping and/or fracturing of the glass panel in response to road loads. In some examples, a relatively thick layer (e.g., ~6 mm to 10 mm) of the soft adhesive is used to allow the adhesive to act as a vibration isolator.

A composite panel according to the present disclosure includes reinforcing fibers that are encapsulated in transparent or opaque resin. In some examples, portions of the composite panel in areas without the reinforcing fibers are transparent. The composite panel is bonded to an interface surface of a body structure using high stiffness adhesive and/or fastened to the interface surface using fasteners and an adhesive. Low, medium and/or high stiffness adhesive can be used since the fasteners provide rigidity. In some examples, the high stiffness adhesive has a stiffness in a range from 50 MPa to 2 GPa. In some examples, the high stiffness adhesive has a stiffness in a range from 75 MPa to 1 GPa. In some examples, the high stiffness adhesive has a stiffness in a range from 75 MPa to 120 MPa. In some examples, the low stiffness adhesive has a stiffness that is less than 20 MPa.

Using higher stiffness adhesives and/or fasteners and adhesive allows the composite panel to provide more significant structural benefits such as increased torsional stiffness, improved roof crush performance, and/or improved vibration response. In addition, a lower volume of adhesive is required to affix the composite panel to the interface surface since vibration isolation (used for glass panels) is no longer required. In some examples, the adhesive has a thickness in a range from 0.5 mm to 2.0 mm is used. In some examples, the adhesive has a thickness in a range from 0.75 mm to 1.25 mm is used.

In some examples, the interface surface of the body structure is made of metal, ceramic, composite structures, and/or mixed materials. In some examples, the interface surface corresponds to a roof structure or upper body structure of a vehicle and the fiber reinforced composite panel corresponds to a composite roof panel of the vehicle.

In some examples, the fiber reinforced composite panel includes reinforcing fibers that are encapsulated in resin. In some examples, transparency of at least one portion of the composite panel is in a range from 0.01% to 99%. In some examples, the reinforcing fibers are continuous, locally applied, and include at least one of carbon fibers, glass fibers, basalt fibers, or other structural fibers.

In some examples, the reinforcing fibers include dry fibers that are infused with a thermoset resin to form a structural composite. In some examples, the dry fibers are stitched to a backing substrate of a preform. In some examples, the dry fibers are consolidated or preformed prior to molding with the thermoset resin. In some examples, the reinforcing fibers have local, non-uniform thickness variations.

In some examples, the dry fibers are infused with a liquid epoxy resin (e.g., resin transfer molding (RTM), high pressure RTM (HP-RTM), resin infusion, wet compression, or other resin molding method). In some examples, the resin comprises a two-part epoxy (epoxy and hardener or catalyst/accelerator/mold release additive/etc.). In some examples, the transparent resin includes one or more additives selected from a group consisting of ultraviolet (UV) absorbers, UV reflectors, tinting additives, infrared (IR) absorbers, IR reflectors, short fiber reinforcements, and/or minerals.

In some examples, the composite panel includes reinforcing fibers that are commingled with non-reinforcing fibers. In some examples, the composite panel includes reinforcing fibers that are commingled with thermoplastic fibers. In some examples, the composite panel is consolidated into a structural insert, and then overmolded with a thermoplastic resin material. In some examples, the commingled fibers (in non-consolidated form) are stitched to a backing substrate prior to consolidation. In some examples, the reinforcing fibers include thermoplastic tape (e.g., a thermoplastic prepreg where the resin is already distributed onto the surface of the reinforcing fibers). In some examples, the tape is arranged directly onto a metallic surface to create the pattern of the reinforcing insert. The patterned tape is removed from the metal surface and consolidated in a press using increased heat and/or pressure. The insert can then be overmolded in resin.

In some examples, the reinforcing fibers and the backing substrate are consolidated using heat and/or pressure. In some examples, the backing substrate, the reinforcing fibers, and/or the commingled fibers are made from the same thermoplastic resin (e.g., polycarbonate, poly(methyl methacrylate) (PMMA), polyethylene terephthalate (PET), cast acrylics, and/or other transparent polymer). In some examples, the structural insert is overmolded and fully encapsulated as a centralized layer with a transparent thermoplastic resin using a resin casting, injection molding, and/or injection-compression molding process.

In some examples, the structural insert is not centrally located through the thickness when overmolded. In some examples, the structural insert has local, non-uniform thickness variations. In some examples, the fiber reinforcement is anisotropic such that local stiffness, thermal expansion, strength, and/or other thermo-mechanical properties vary as a function of location within the composite panel.

In some examples, portions of the composite panel are covered with a coating. In some examples, the composite panel is coated with a protective coating (hard coat for scratch resistance, UV or IR coating for UV/IR absorption, reflection, or a combination of all coatings) on one or more sides thereof. In some examples, the infusing and/or over molding resin includes short reinforcing fibers (e.g., ≤12.7 mm), long reinforcing fibers (e.g., >12.7 mm), minerals, and/or a combination thereof.

Figure 1B:
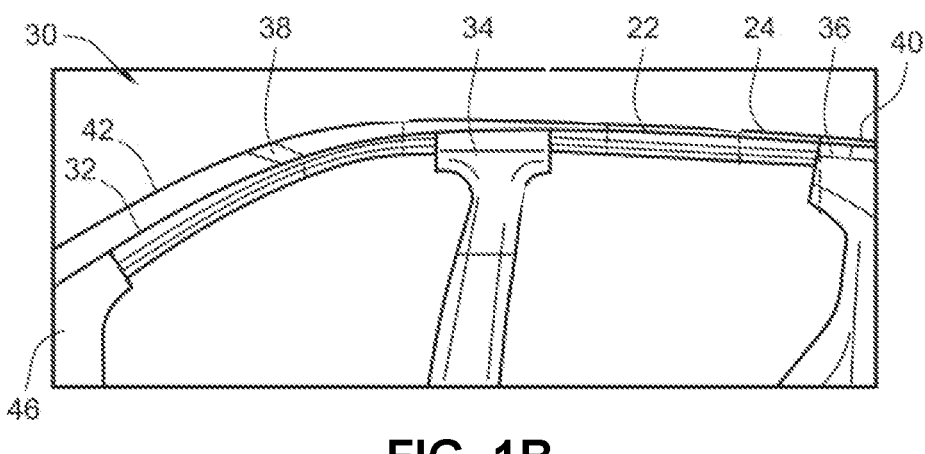
FIG. 1B is an enlarged side view of an example of a vehicle including a composite roof panel according to the present disclosure.

Referring now to FIGS. 1A and 1B, an example of a structural, fiber reinforced composite panel is shown. The composite panel is bonded to an interface surface of a body structure of a vehicle using high stiffness adhesive and/or fasteners and adhesive. While the foregoing description relates to a roof panel that is rigidly bonded and/or fastener to roof rails and/or a header of a roof of a vehicle, the composite panel can be attached to other interface surfaces of the vehicle. For example, the composite panel can be arranged in a location of a quarter window, side windows, an engine cover, windshield, rear window, and/or other locations.

In FIGS. 1A and 1B, a vehicle 10 includes wheels 11, a body 12 including a roof structure 14, a passenger compartment 16, a windshield 42, a rear window 44, and a propulsion source 18 (e.g., an internal combustion engine, a fuel cell, an electric motor, etc.). The wheels 11, the body 12, and the propulsion source 18 are mounted to a frame 20. In FIG. 1B, the roof structure 14 includes a roof panel 24, roof rails 22, and roof headers 38 and 40. The roof rails 22 are connected to roof headers 38 and 40. The roof panel 24 is bonded using high stiffness adhesive to the roof rails 22 and the roof headers 38 and 40. In some examples, fasteners are used in addition to or instead of the high stiffness adhesive to rigidly attach the composite panel to the interface surface.

A load-bearing upper body structure 30 includes an A pillar 32 that is arranged at a forward end of the passenger compartment 16. A C pillar 36 is arranged at a rearward end of the passenger compartment 16. A B pillar 34 is arranged between the A pillar 32 and the C pillar 36. The A pillar 32, the B pillar 34, and the C pillar 36 support the roof structure 14. The A pillar 32 is connected to a lower hinge pillar 46 and to the roof rail 22. The B pillar 34 and C pillar 36 connect other portions of the frame 20 to the roof rails 22. In some examples, the B pillar is omitted and/or a D pillar is used.

Figure 2A:
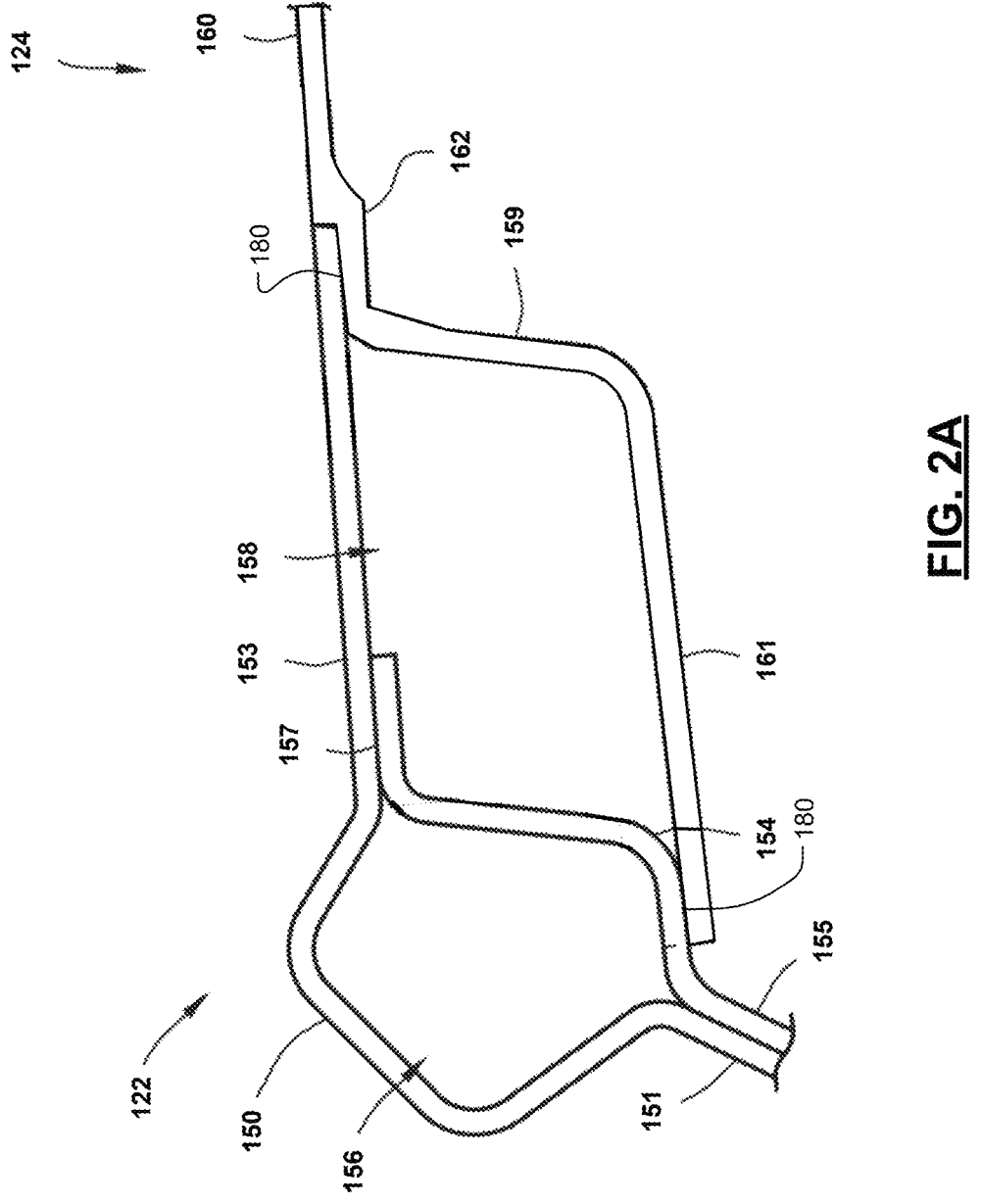
FIGS. 2A and 2B are side cross sectional views of examples of composite panels bonded and/or fastened to interface surfaces using high stiffness adhesive and/or fasteners and adhesive according to the present disclosure.
Figure 2B:
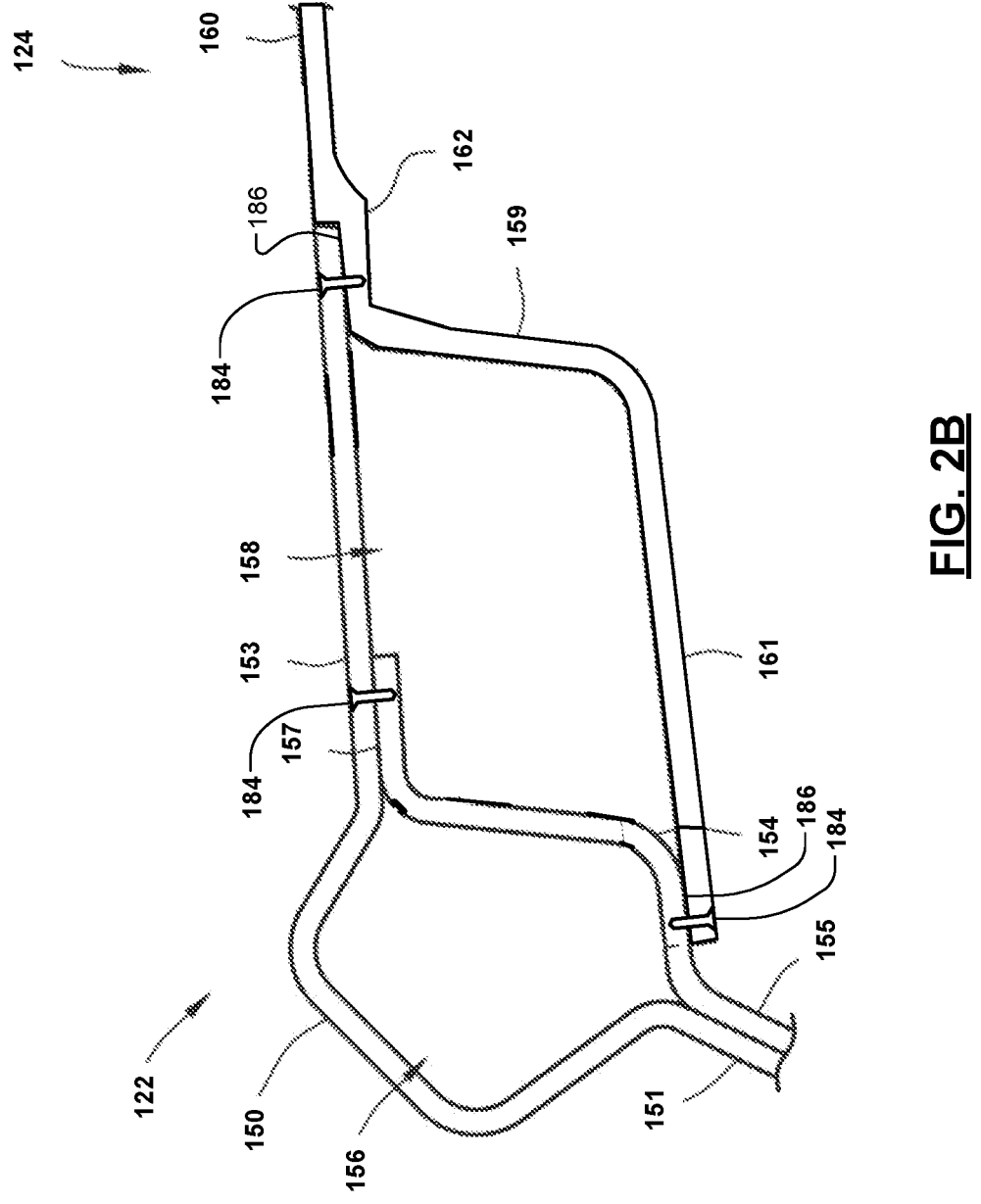

Referring now to FIGS. 2A and 2B, a roof panel 124 is shown connected to a roof rail 122. The roof rail 122 includes an outer contoured panel 150 including flanges 151 and 153. The outer contoured panel 150 is connected to an inner contoured panel 154 to define a cavity 156. The inner contoured panel 154 includes flanges 155 and 157. The flanges 151 and 153 of the outer contoured panel 150 are connected to the flanges 155 and 157 of the inner contoured panel 154. The roof panel 124 includes a main panel section 160, an inboard panel section 159, and an outboard panel section 161. The inboard panel section 159 and the outboard panel section 161 define a cavity 158 with an inner surface of the roof rail 122. The inboard panel section 159 and the outboard panel section 161 are connected to the flanges 153 and the inner contoured panel 154, respectively, using welding, fasteners and/or adhesive.

The roof panel 124 is affixed to the roof rail 122 using high stiffness adhesive 180 (FIG. 2A) and/or fasteners 184 and adhesive 186 (FIG. 2B). The adhesive 186 may include high, medium or low stiffness adhesive since the fasteners provide rigidity. In some examples, the high stiffness adhesive 180 has a stiffness in a range from 50 MPa to 2 GPa. In some examples, the high stiffness adhesive has a stiffness in a range from 75 MPa to 1 GPa.

Figure 3A:
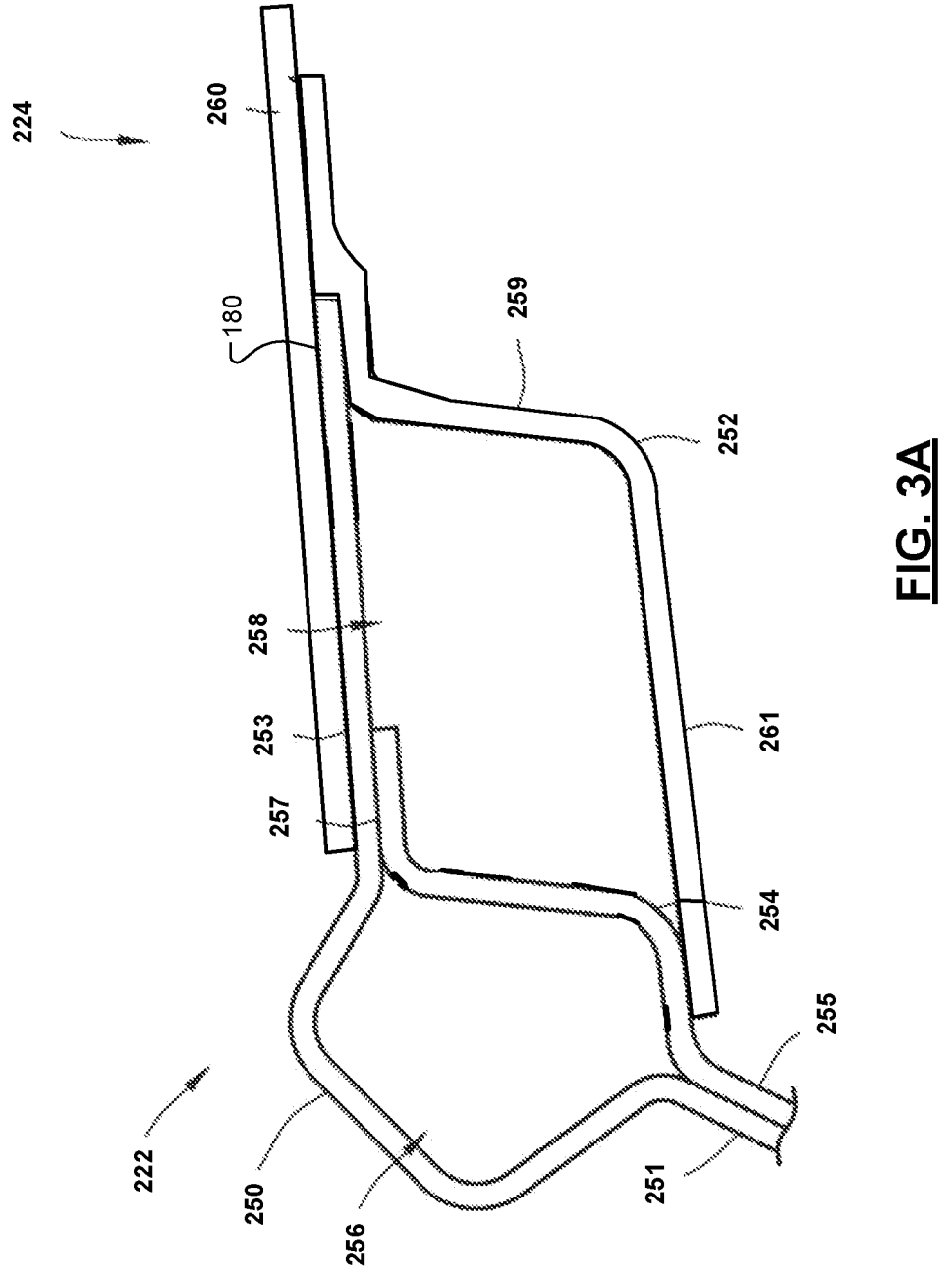
FIGS. 3A to 3C are side cross sectional views of other examples of composite panels bonded and/or fastened to interface surfaces using high stiffness adhesive and/or fasteners and adhesive according to the present disclosure.
Figure 3B:
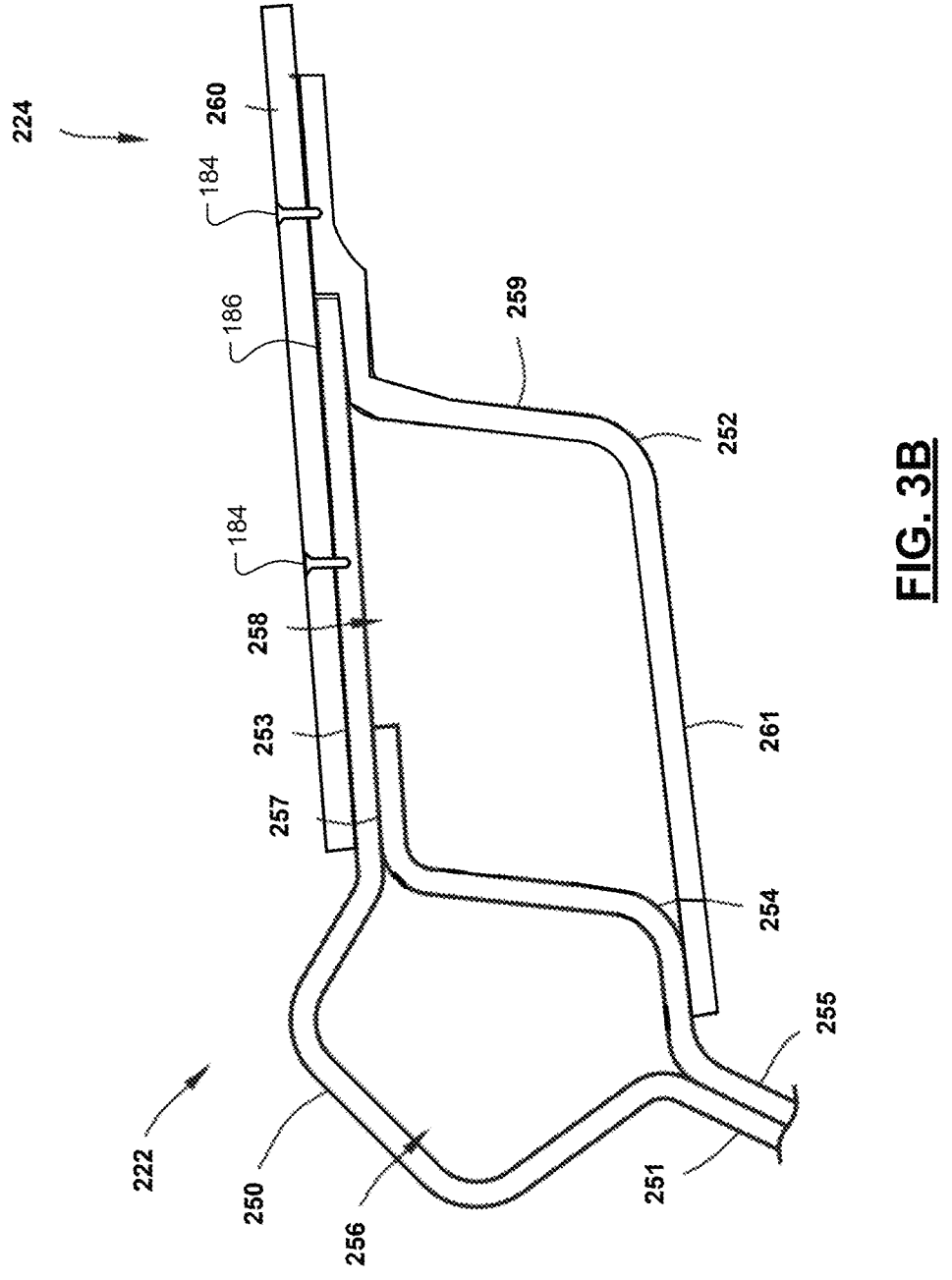
Figure 3C:
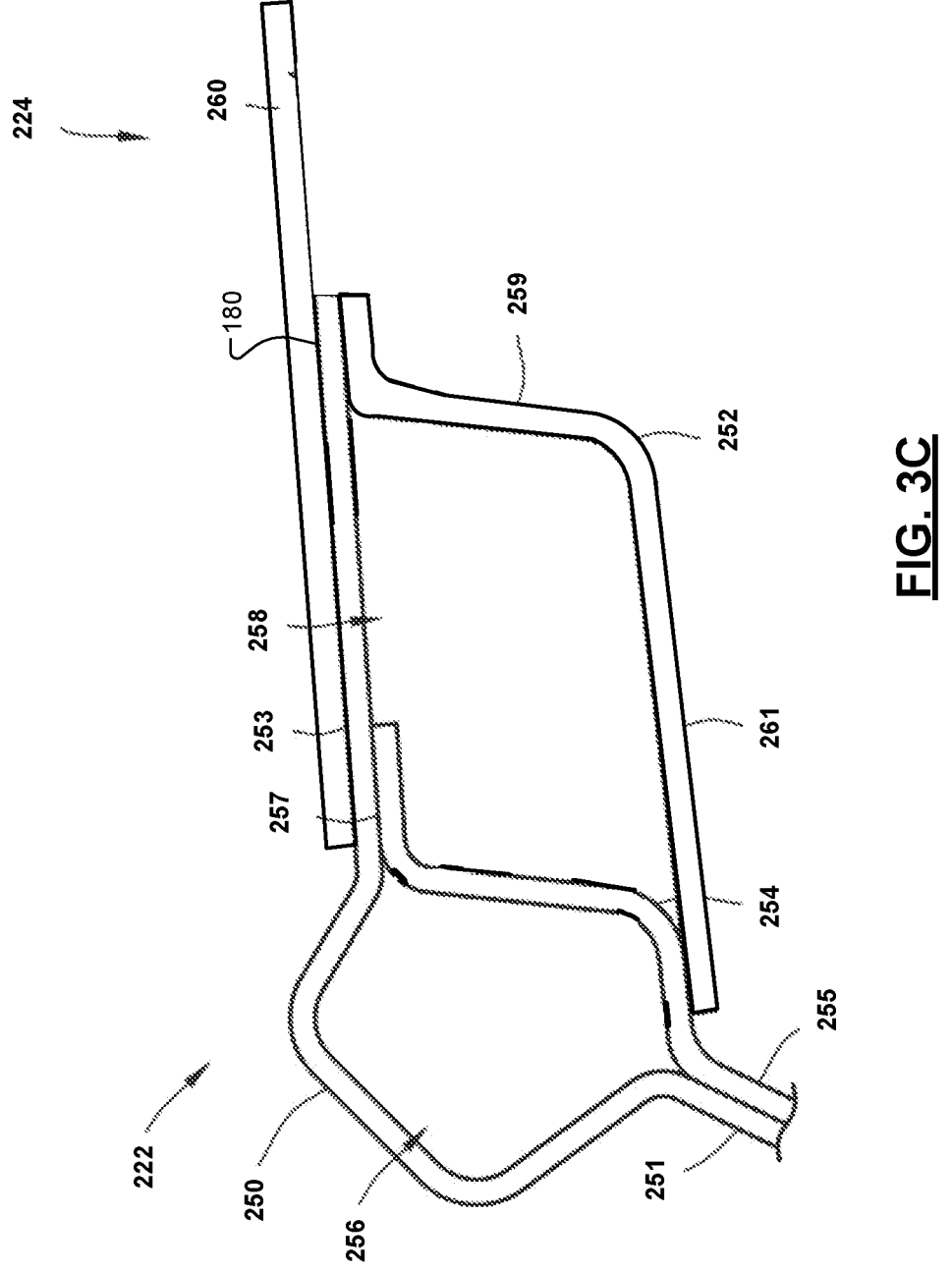

Referring now to FIGS. 3A to 3C, a roof panel 224 is shown connected to a roof rail 222. The roof rail 222 includes an outer contoured panel 250 including flanges 251 and 253. The outer contoured panel 250 is connected to an inner contoured panel 254 to define a cavity 256. The inner contoured panel 254 includes flanges 255 and 257. The flanges 251 and 253 of the outer contoured panel 250 are connected to the flanges 255 and 257 of the inner contoured panel 254, respectively. A supporting panel 252 includes an inboard panel section 259 and an outboard panel section 261 that define a cavity 258 with an inner surface of the roof rail 122. The supporting panel 252 is attached to the inner contoured panel 254 and the flange 253 of the outer contoured panel 250. The roof panel 224 includes a main panel section 260.

The roof panel 224 includes a fiber reinforced composite panel with local, continuous fiber reinforcement. The roof panel 224 is affixed to the roof rail 222 and the supporting panel 252 using high stiffness adhesive 180 (FIG. 3A) and/or the fasteners 184 and the adhesive 186 (FIG. 3B). In some examples, the high stiffness adhesive 180 has a stiffness in a range from 50 MPa to 2 GPa. In some examples, the high stiffness adhesive has a stiffness in a range from 75 MPa to 1 GPa. In FIG. 3C, the supporting panel 252 includes an inner end that terminates near an inner end of the flange 253 of the outer contoured panel 250.

Figure 4:
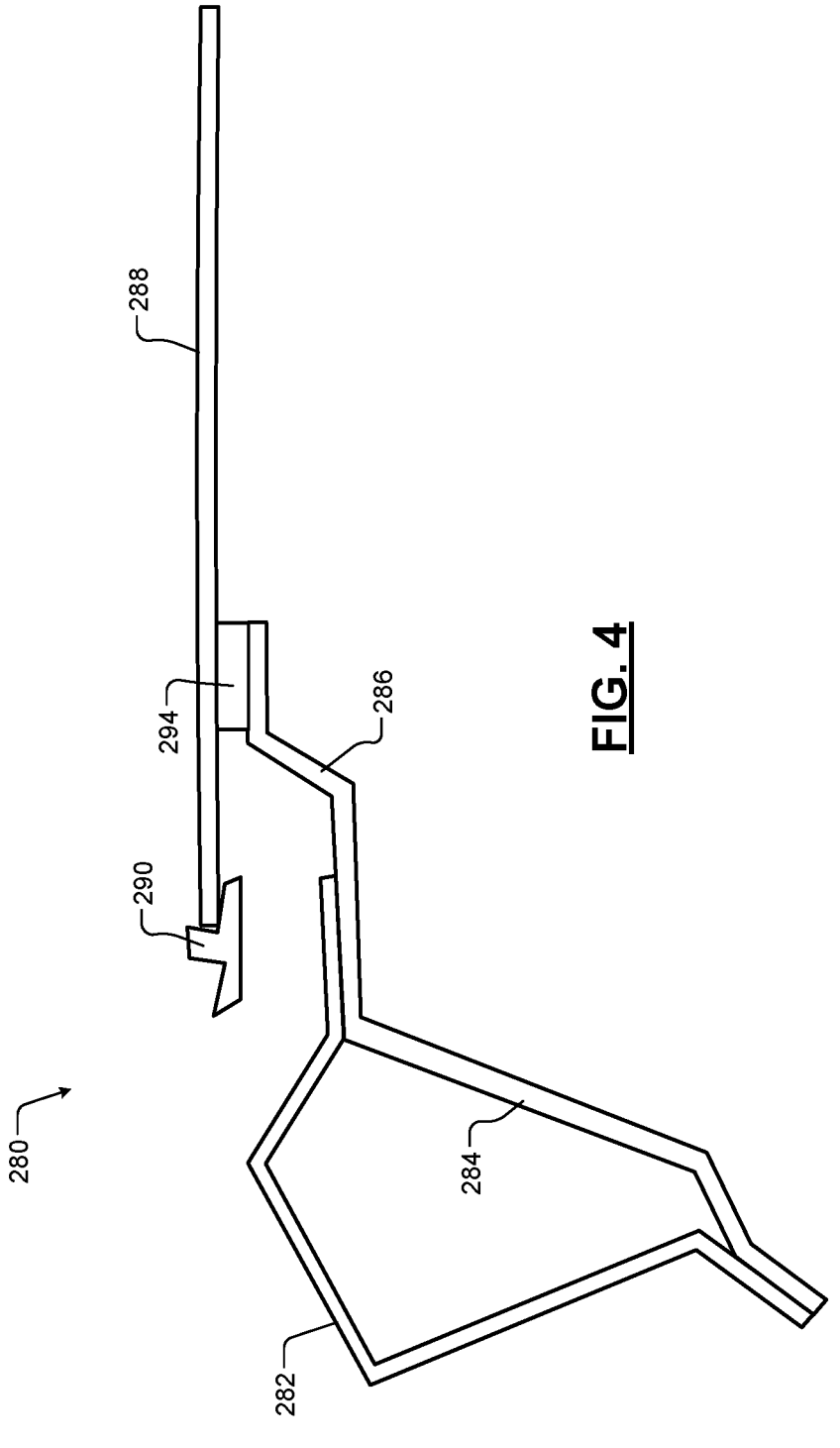
FIG. 4 is a side cross sectional view of a composite panel bonded and/or fastened to interface surfaces using high stiffness adhesive and/or fasteners and adhesive according to the present disclosure.

Referring now to FIG. 4, a roof structure 280 defines an interface surface to mount a composite panel. The roof structure 280 includes an outer roof rail 282 connected to an inner roof rail 284 including a flange 286 extending therefrom. A composite panel 288 is attached to the flange 286 of the inner roof rail 284 using adhesive 294 and/or adhesive and fasteners as described above. In some examples, a rubber gasket or seal 290 is overmolded onto the composite panel 288 and acts as a weather seal.

Referring now to FIG. 5A, a preform 310 may be used to produce the composite panel. The preform 310 includes a backing substrate 315. In some examples, continuous reinforcing fibers 312 such as fiber tows are attached to the backing substrate 315 using stitches 316. In some examples, the backing substrate 315 is transparent and is made of a material compatible with a transparent resin used to encapsulate or consolidate the composite panel. In some examples, the continuous reinforcing fibers 312 are placed using automated fiber placement or tailored fiber placement (TFP) methods using robots to place and stitch or otherwise attach the reinforcing fibers to the backing substrate 315. In other examples, the continuous reinforcing fibers are placed on a molding tool or other surface without the backing substrate.

In some examples, the continuous reinforcing fibers 312 include carbon fibers, glass fibers, basalt fibers, and/or other continuous reinforcing fibers. In some examples, the continuous reinforcing fibers 312 are commingled with other continuous reinforcing fibers and/or with thermoplastic fibers such as nylon, acrylic, and/or polycarbonate. In some examples, carbon fiber reinforcing fibers are commingled with polycarbonate fibers and the stitching fiber and the substrate are made of polycarbonate.

Referring now to FIGS. 5B to 5D, the continuous reinforcing fibers 312 in the preform 310 can be arranged in different horizontal and/or vertical locations in a thickness direction of the preform 310. In FIG. 5B, the continuous reinforcing fibers 312 are arranged adjacent to the backing substrate 315, which is located adjacent to optional outer protective coating layers 364 and 366.

In some examples, the outer coating layers provide scratch resistance, weathering, or other protection. When polycarbonate is used, a scratch resistant coating such as AS4700 from Momentive may be used. When polycarbonate is used, a coating such as poly(methyl methacrylate) (PMMA) may also be used to improve weathering layer (e.g., yellowing, cracking, or otherwise deteriorating due to UV exposure and scratch and mar). In other examples, additives are added to the resin to increase resistance to scratching, ultraviolet exposure, and/or infrared exposure.

In FIG. 5C, the continuous reinforcing fibers 312 are arranged adjacent to the backing substrate 315, which is consolidated in the middle of the preform 310 using two or more consolidation steps. In FIG. 5D, the continuous reinforcing fibers 312 may include one or more ribs 370 by placing fibers in a stack extending transversely relative to other ones of the continuous reinforcing fibers 312.

Figure 6:
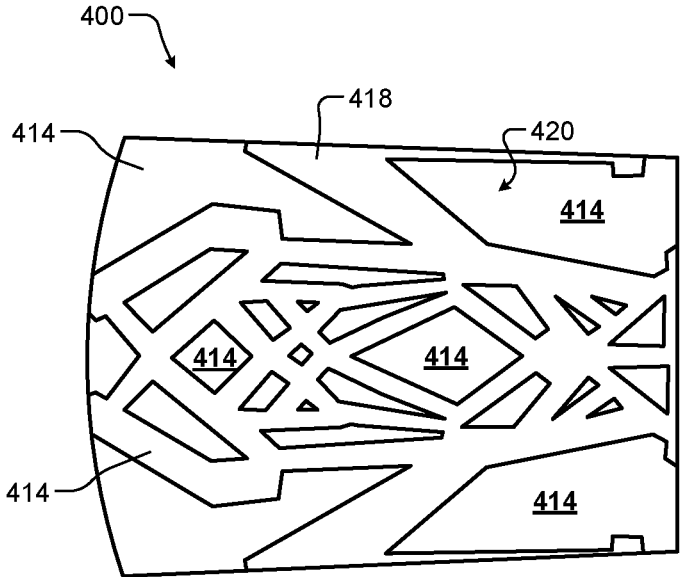
FIG. 6 is a plan view of a composite roof panel of a vehicle according to the present disclosure.

Referring now to FIG. 6, a composite panel 400 such as a roof panel is shown. The composite panel 400 includes reinforcing fibers 418 arranged in a predetermined pattern 420 and encapsulated in resin. In some examples, the composite panel 400 includes regions 418 that do not include reinforcing fibers. In some examples, the regions 418 are transparent. In other examples, the regions 414 are opaque. In some examples, the predetermined pattern 420 is symmetric about a horizontal, radial, and/or vertical center line of the composite panel 400. In other examples, the predetermined pattern 420 is asymmetric. Because the composite panel 400 is structurally rigid and strong (as compared to a glass panel), the composite panel 400 can be rigidly attached to the vehicle using high stiffness adhesive and/or fasteners and adhesive rather than the soft adhesive as described above.

In some examples, the continuous reinforcing fibers include carbon fiber. In other examples, the reinforcing fibers include one or more fibers selected from a group consisting of glass, basalt, flax, hemp, pineapple, and cellulose. In other features, first fibers (selected from a group consisting of carbon, glass, basalt, flax, hemp, pineapple, and cellulose) are commingled with second fibers selected from a group consisting of polycarbonate, nylon, polyetheretherketone (PEEK), polyetherimide (PEI), polyphenylene sulfide (PPS), polyester, polyethylene, and polypropylene) in order to consolidate the fiber preform prior to over-molding. In some examples, the plurality of fibers has a shape selected from the group consisting of cylindrical, flat, or both cylindrical and flat.

Suitable fiber materials may include carbon fibers (e.g., carbon nanotubes, talc, fibers derived from polyacrylonitrile and/or pitch precursors), glass fibers (e.g., fiber glass, quartz), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), natural fibers (e.g., cotton, flax, cellulose, spider silk), and combinations thereof, by way of example. In some examples, the reinforcing fibers comprise fiber tow including one or more continuous fibers and an outer layer surrounding the one or more continuous fibers.

In some examples, the substrate and/or the resin includes one or more materials selected from a group consisting of polycarbonate, polypropylene, epoxy, polyurethane, polymethylmethacrylate, a polyamide, styrene-acrylonitrile, methyl methacrylate-acrylonitrile-butadiene-styrene, styrene methyl methacrylate, a glass fiber backing, polyester, and/or other transparent polymer.

The backing substrate and/or the resin may be a thermoset layer or a thermoplastic layer that is substantially transparent when free of fibers. In certain aspects, the supporting layer may be a thermoset supporting layer selected from the group consisting of: benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-supporting layers thereof, and combinations thereof.

In some examples, the resin is mixed with at least one of short fibers, long fibers, and/or minerals. As used herein, short fibers have a length less than 12.7 mm and long fibers have a length greater than or equal to 12.7 mm.

In some examples, the substrate includes a thermoplastic supporting layer selected from the group consisting of: polyethylenimine (PEI), polyamide-imide (PAI), polyamide (PA) (e.g., nylon 6, nylon 66, nylon 12, nylon 11, nylon 6-3-T), polyetheretherketone (PEEK), polyetherketone (PEK), polyvinyl chloride (PVC), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), styrene methyl methacrylate (SMMA), methyl methacrylate acrylonitrile butadiene styrene (MABS), polycarbonate (PC), polyaryletherketone (PAEK), polyetherketoneketone (PEKK), co-supporting layers thereof, and combinations thereof.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A structural component, comprising:
a body structure defining an interface surface;
a composite panel comprising a plurality of reinforcing fibers encapsulated in a resin; and
an adhesive affixing the composite panel to the interface surface of the body structure,
wherein the adhesive has a stiffness in a range from 50 MPa to 2 GPa, and
wherein the plurality of reinforcing fibers comprises dry fibers infused with the resin, and the resin comprises thermoset resin.

2. The structural component of claim 1, wherein the body structure includes one or more materials selected from a group consisting of metal, ceramic, and composite.

3. The structural component of claim 1, wherein the body structure comprises at least one of a roof rail and a header of a vehicle and the composite panel comprises a roof panel.

4. The structural component of claim 1, wherein at least a portion of the composite panel is transparent.

5. The structural component of claim 1, wherein the plurality of reinforcing fibers is, locally applied, and includes at least one fiber selected from a group consisting of carbon fibers, glass fibers, and basalt fibers.

6. The structural component of claim 1, wherein the dry fibers are stitched to a backing substrate.

7. The structural component of claim 1, further comprising a coating arranged on at least one surface of the composite panel, wherein the coating is selected from a group consisting of a scratch resistant coating, an ultraviolet resistant coating, and an infrared resistant coating.

8. The structural component of claim 1, wherein the resin is mixed with an additive selected from a group consisting of a scratch resistant additive, an ultraviolet resistant additive, and an infrared resistant additive.

9. A roof of a vehicle, comprising:

an interface surface defined by at least one of a roof rail and a header of a roof structure of a vehicle;

a composite roof panel comprising a plurality of reinforcing fibers stitched to a backing substrate and encapsulated in a resin, wherein the plurality of reinforcing fibers comprises dry fibers infused with the resin, and the resin comprises thermoset resin; and at least one of:

a first adhesive affixing the composite roof panel to the interface surface, wherein the first adhesive has a stiffness in a range from 50 MPa to 2 GPa, and fasteners and a second adhesive affixing the composite roof panel to the interface surface.

10. The roof of claim 9, wherein the first adhesive affixes the composite roof panel to the interface surface.

11. The roof of claim 9, wherein the fasteners and the second adhesive affix the composite roof panel to the interface surface.

12. The roof of claim 9, wherein at least a portion of the composite roof panel is transparent.

13. The roof of claim 9, wherein the plurality of reinforcing fibers include at least one fiber material selected from a group consisting of carbon, glass, and basalt.

14. The roof of claim 9, further comprising a coating arranged on at least one surface of the composite roof panel, wherein the coating is selected from a group consisting of a scratch resistant coating, an ultraviolet resistant coating, and an infrared resistant coating.

15. The roof of claim 9, wherein the resin is mixed with an additive selected from a group consisting of a scratch resistant additive, an ultraviolet resistant additive, and an infrared resistant additive.

16. The roof of claim 13, further comprising a coating arranged on at least one surface of the composite roof panel, wherein the coating is selected from a group consisting of a scratch resistant coating, an ultraviolet resistant coating, and an infrared resistant coating.

17. The roof of claim 13, wherein the resin is mixed with an additive selected from a group consisting of a scratch resistant additive, an ultraviolet resistant additive, and an infrared resistant additive.

18. The structural component of claim 6, wherein the plurality of reinforcing fibers includes at least one fiber selected from a group consisting of carbon fibers, glass fibers, and basalt fibers.

19. The structural component of claim 6, further comprising a coating arranged on at least one surface of the composite panel, wherein the coating is selected from a group consisting of a scratch resistant coating, an ultraviolet resistant coating, and an infrared resistant coating.

20. The structural component of claim 6, wherein the resin is mixed with an additive selected from a group consisting of a scratch resistant additive, an ultraviolet resistant additive, and an infrared resistant additive.

* * * * *